Aug. 13, 1929.  C. H. STRUPE  1,724,888
SNARE STRAINER
Filed Feb. 23, 1926
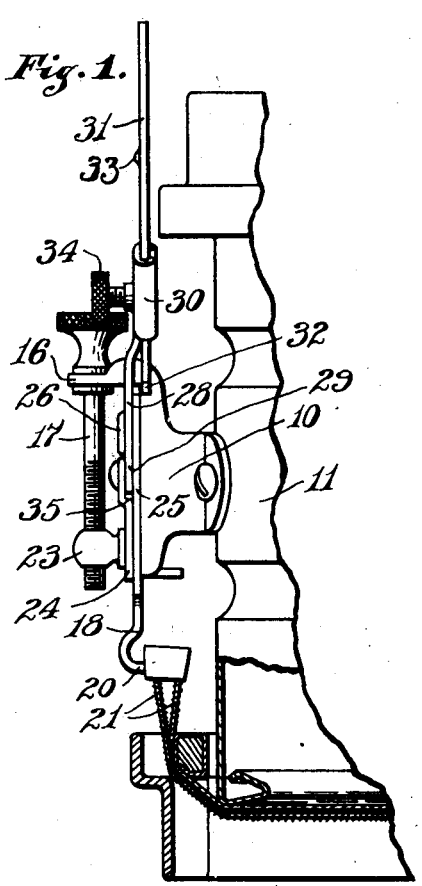
Fig. 1.
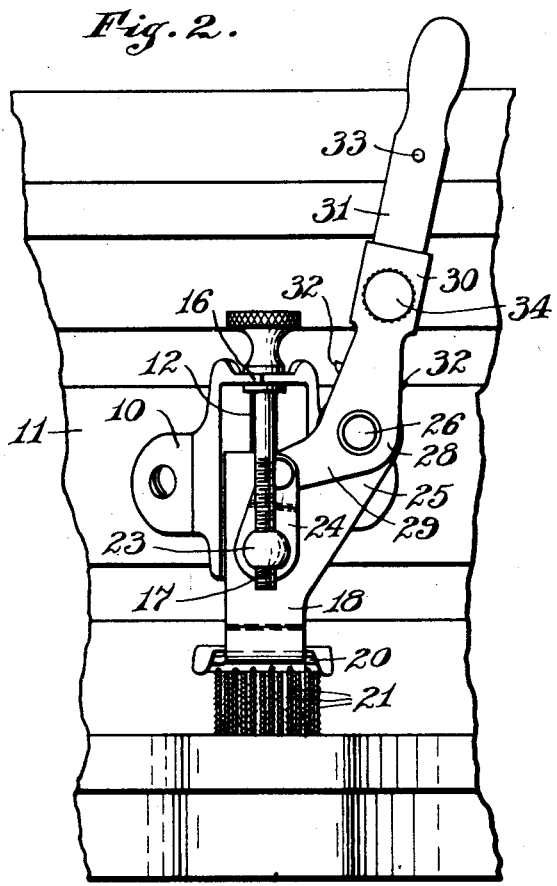
Fig. 2.
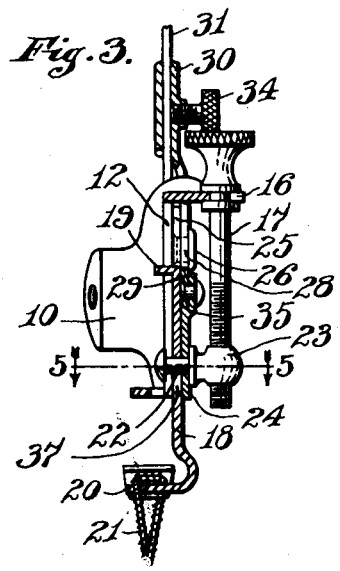
Fig. 3.
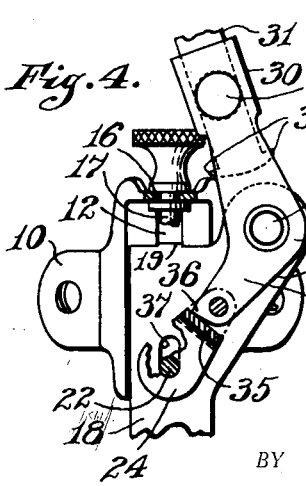
Fig. 4.
Fig. 5.
Fig. 6.
INVENTOR.
Cecil H. Strupe,
BY
Hood & Hahn.
ATTORNEYS Patented Aug. 13, 1929.

1,724,888

UNITED STATES PATENT OFFICE.

CECIL H. STRUPE, OF INDIANAPOLIS, INDIANA, ASSIGNOR TO LEEDY MANUFACTURING COMPANY OF INDIANAPOLIS, INDIANA, OF INDIANAPOLIS, INDIANA, A CORPORATION OF INDIANA.

SNARE STRAINER.

Application filed February 23, 1926. Serial No. 89,844.

The object of my invention is to produce an efficient snare strainer for snare drums, the construction being such that the snares may be readily shifted away from contact with the snare head and returned to contact with the snare head at the initial tension adjustment, and such that the structure may be readily attached to and used in conjunction with drums of different axial dimensions, and readily adjusted for transportation.

The accompanying drawings illustrate my invention. Fig. 1 is a side elevation of my improved strainer in conjunction with adjacent portions of a drum, portions of which are shown in axial section; Fig. 2 a front elevation of the parts shown in Fig. 1; Fig. 3 a vertical section of my improved strainer; Fig. 4 a fragmentary front elevation in partial vertical section; Fig. 5 a transverse section on line 5—5 of Fig. 3 and Fig. 6 a fragmentary perspective showing the relation between the upper end of the snare plate and the supporting bracket.

In the drawings 10 indicates the main body or supporting bracket of my device formed for attachment to the shell 11 of a drum. This bracket 10 is formed with a vertical slot 12 and has journaled in its upper lip 16 the adjusting screw 17, said screw lying in the same radial plane as slot 12. Slidably mounted on bracket 10 is the snare-plate 18 provided at its upper end with a T-finger 19 slidably mounted in slot 12, and at its lower end with inturned finger 20 to which the snares 21 are connected. Slidably mounted in slot 12 below finger 19 is the headed shank 22 of a nut 23, threaded to receive screw 17. Journaled upon shank 22 between the main body of nut 23 and the snare plate 18 is a toggle link 24. Snare plate 18 at its upper end is provided with a lateral extension 25 upon which is pivoted, at 26, a bell crank lever 28, the arm 29 of which is pivoted to link 24 and forms the outer link of the toggle. The upper arm of lever 28 is formed into a slotted guide 30 in which is slidably mounted the manipulating handle 31 which, at its lower end, is provided with lateral extensions 32, preventing outward withdrawal of the handle 31 from guide 30. After the handle has been inserted in the guide, a small teat 33 is struck up from the body of handle 31 so as to limit inward movement of the handle in the guide and prevent the handle from being entirely withdrawn. The handle 31 may be held in any desired position of extension in guide 30 by screw 34.

In order to limit toggle movement of levers 24 and 29 in the direction of movement which places the snares under stress, link 24 is formed with a shoulder 35 (Fig. 3) contacted by a portion 36 (Fig. 4) of arm 29 when lever 28 is thrown to snare-stressing position, as shown in Fig. 4.

Snare plate 18 is slotted at 37 (Fig. 4) to permit relative movement between nut 23 and plate 18.

Handle 31 has a sufficient range of movement so that when the bracket is attached to drums of different axial dimensions the handle may be projected far enough to bring its outer end into position slightly above the plane of the beater head, where it may be readily engaged by the drummer, and may be moved inwardly to a point where its outer end lies below the beater head so that in transportation it may not be injured.

I claim as my invention:

1. A snare strainer comprising a slotted bracket, an adjusting screw journaled in said bracket parallel with the slot, a snare plate slidably mounted on the bracket and interlocking with the slot, a nut threaded to receive the adjusting screw and having a shank projected through a slot in the snare plate and the slot in the bracket and axially interlocked with the bracket, a toggle link journaled on the said shank, a second toggle link journaled on the snare plate and pivotally connected to the first toggle link, and a manipulating handle carried by said second toggle link.

2. A snare strainer comprising a slotted bracket, an adjusting screw journaled in said bracket parallel with the slot, a snare plate slidably mounted on the bracket and interlocking with the slot, a nut threaded to receive the adjusting screw and having a shank projected through a slot in the snare plate and the slot in the bracket and axially interlocked with the bracket, a toggle link journaled on the said shank, a second toggle link journaled on the snare plate and pivotally connected to the first toggle link, a manipulating handle carried by said second toggle link, said manipulating handle comprising an element slidably associated with the second toggle link, and means for holding the sliding element in various positions of adjustment.

3. A snare strainer comprising a slotted bracket, an adjusting screw journaled in said bracket parallel with the slot, a snare plate slidably mounted on the bracket and interlocking with the slot, a nut threaded to receive the adjusting screw and having a shank projected through a slot in the snare plate and the slot in the bracket, and axially interlocked with the bracket, a toggle link journaled on the said shank, a second toggle link journaled on the snare plate and pivotally connected to the first toggle link, a manipulating handle carried by said second toggle link, said manipulating handle comprising an element slidably associated with the second toggle link, means for limiting such sliding movement in both directions, and means for holding the sliding element in various positions of adjustment.

In witness whereof, I have hereunto set my hand at Indianapolis, Indiana, this 19th day of February, A. D. one thousand nine hundred and twenty six.

CECIL H. STRUPE.